United States Patent [19]
Miller et al.

[11] 4,444,575
[45] Apr. 24, 1984

[54] FILTER SYSTEM

[75] Inventors: Frank H. Miller, Downey; David V. Hull, Fountain Valley, both of Calif.

[73] Assignee: Rockwell International Corporation, El Segundo, Calif.

[21] Appl. No.: 413,309

[22] Filed: Aug. 31, 1982

[51] Int. Cl.³ ............................................. B01D 50/00
[52] U.S. Cl. ........................................ 55/316; 55/318; 55/484; 55/485; 55/495; 55/DIG. 9; 55/DIG. 10; 55/DIG. 31
[58] Field of Search ................ 55/279, 316, 318, 350, 55/466, 482, 484, 485, 495, 528, DIG. 9, DIG. 10, DIG. 31; 210/323.1

[56] References Cited
U.S. PATENT DOCUMENTS

| | | | |
|---|---|---|---|
| 2,246,994 | 6/1941 | Herbster | 55/DIG. 10 |
| 2,557,279 | 6/1951 | Greenberg | 55/DIG. 31 |
| 2,708,982 | 5/1955 | McGuff et al. | 55/528 |
| 2,951,551 | 9/1960 | West | 55/316 |
| 3,556,735 | 1/1971 | Epelman | 55/316 |
| 3,657,992 | 4/1972 | Minnick, Jr. | 55/279 |
| 4,121,916 | 10/1978 | Fricke | 55/316 |

FOREIGN PATENT DOCUMENTS

| | | | |
|---|---|---|---|
| 2928234 | 1/1981 | Fed. Rep. of Germany | 55/485 |
| 164449 | 8/1958 | Sweden | 55/350 |
| 475087 | 6/1937 | United Kingdom | 55/316 |

Primary Examiner—David L. Lacey
Attorney, Agent, or Firm—Charles T. Silberberg; Max Geldin

[57] ABSTRACT

A filter system particularly adapted to remove particulate aerosol and vapor contamination from air comprising, an outer shell having a contaminated air inlet cap connected to one end and a clean air outlet cap connected to the other end, and a plurality of filter units mounted axially in the shell, each of said units comprising two containers, one of the containers having a particle/aerosol filter element therein such as paper, and the other of the containers having a vapor filter element therein, such as charcoal, the two containers of each filter unit being positioned in contiguous relation. A vapor passage is provided from one container to the other container of each unit and an annulus is provided between the outer periphery of the containers and the inner surface of the shell. A plurality of elongated inlet conduits is provided in the annulus, each of the respective conduits defining an inlet passage to the one container of each of the filter units, and a plurality of elongated outlet conduits is provided in the annulus, each of the outlet conduits defining an outlet passage from the other container of each of the filter units. The inlet conduits communicate with the inlet cap and the outlet conduits communicate with the outlet cap.

10 Claims, 12 Drawing Figures

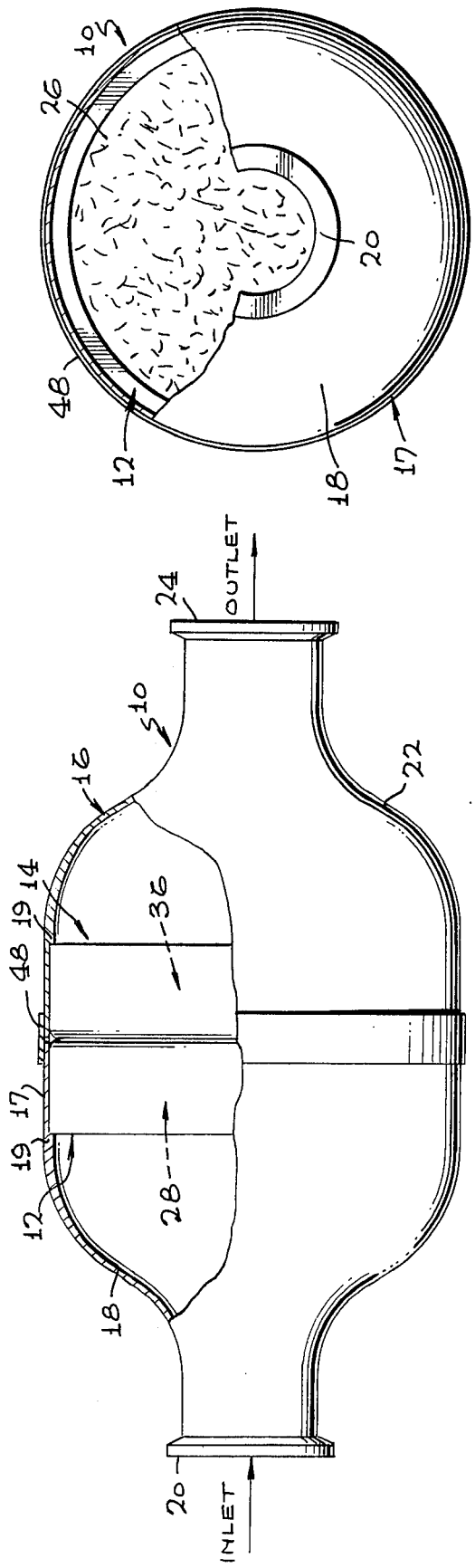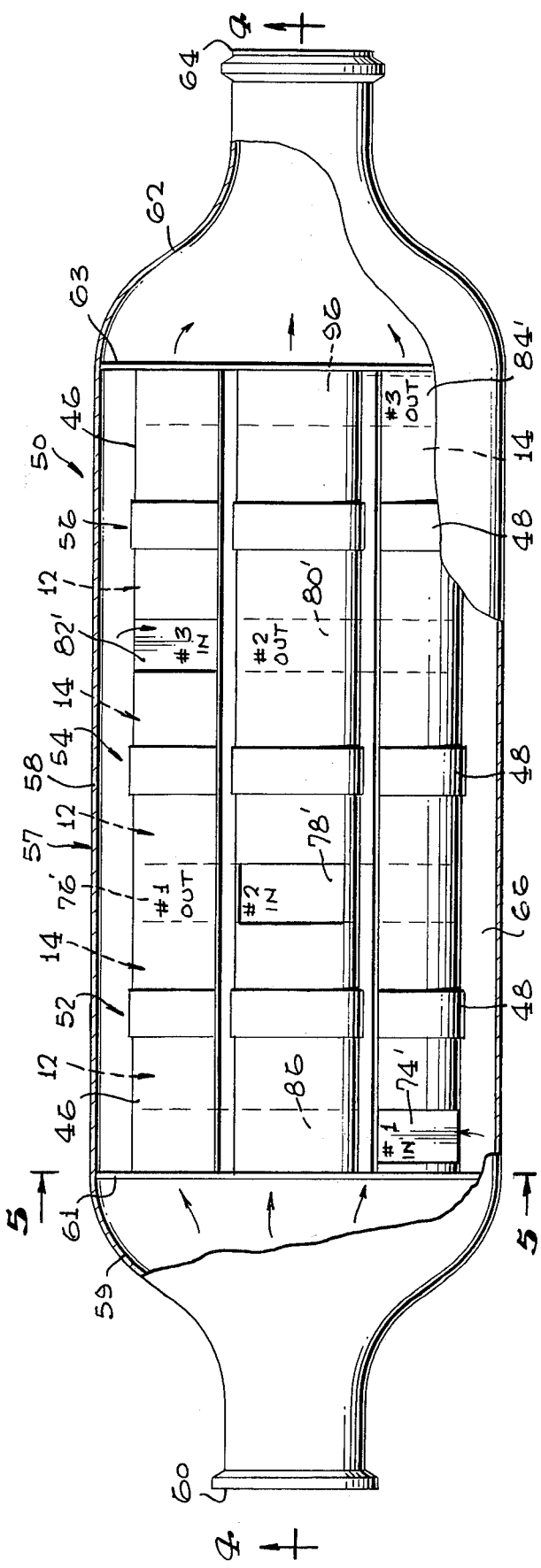

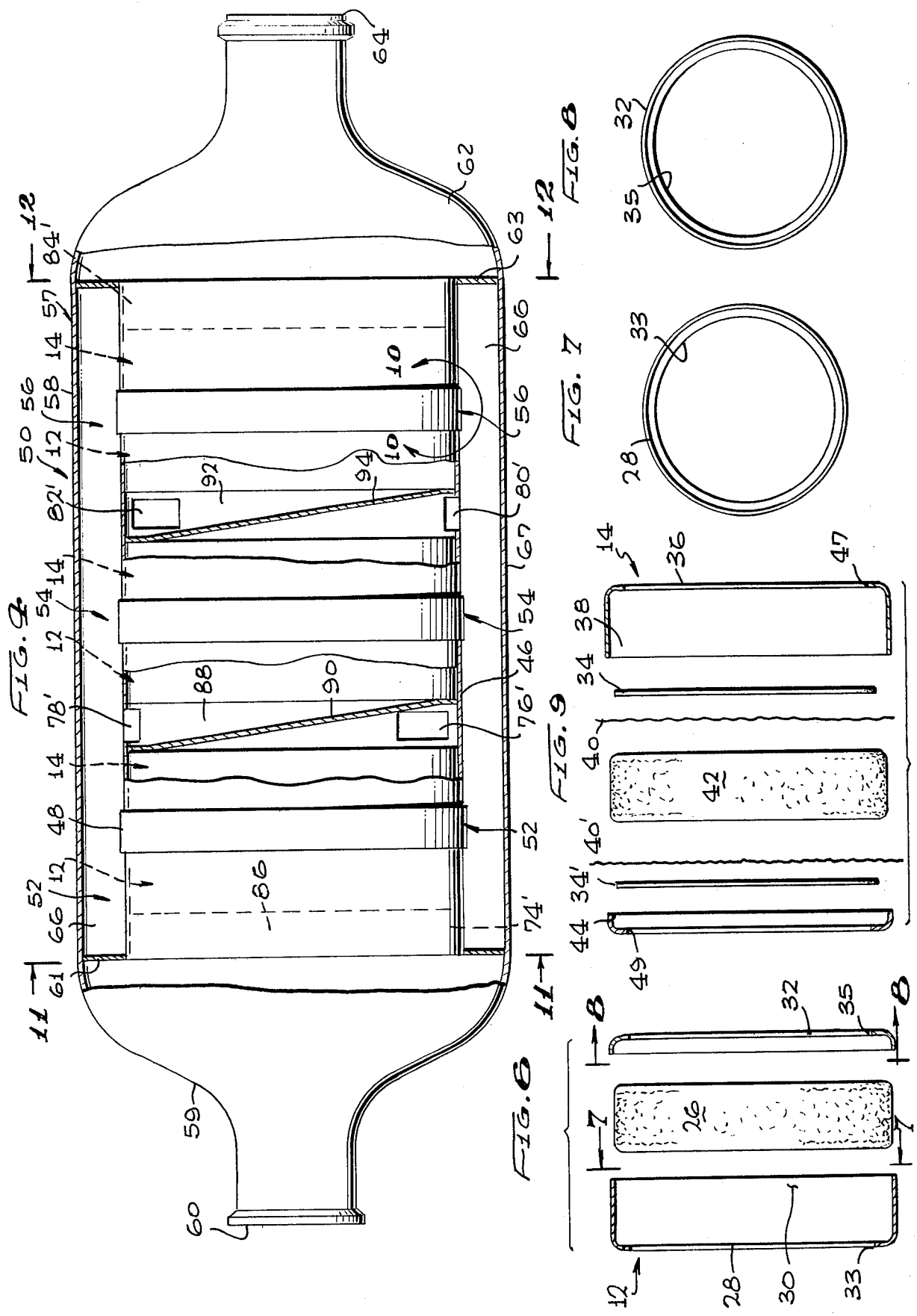

FILTER SYSTEM

BACKGROUND OF THE INVENTION

This invention relates to a filter system, and is particularly concerned with a multiple unit assembly of filter elements especially designed to remove particulate aerosol and vapor contaminants from air entering the aircraft before delivery of the air to the crew or equipment.

Filter devices have been used by the armed forces for protection of the crews of vehicles such as tanks, trucks and the like. However, the devices used on these ground vehicles are bulky, heavy and are not capable of withstanding the environment of high temperatures, high pressures and humidities supplied by aircraft environmental control systems and the physical location in the vehicle. Further, the prior art does not appear to disclose an efficient filter device for removing a combination of particulate, aerosol and vapor contamination from air, especially in the nature of chemical, biological and/or nuclear contaminants.

U.S. Pat. No. 3,922,152 describes a series type multiple stage filter and a parallel type multiple stage filter wherein each stage of the filter includes a tubular coil, a porous filtering media disposed in layers and for filtering gases, a cleaning liquid to a level above the porous filtering media through which the gases are passed for treatment. Such filter is useful in motor vehicle exhaust systems, for industrial applications, e.g. for filtering stack gasses, and for water purification. The filter is cleaned without removing it from its environment, for example when in the exhaust line of a motor vehicle. This filter device is not adapted to the removal of aerosols or particles.

U.S. Pat. No. 3,906,798, discloses a protector means for preventing moisture and oxygen present in a source of air from entering into a sealed housing and affecting the operation of an instrument located in the housing, comprising a filtering material having a first section which contains a zeolite and a second section containing silica gel particles, the zeolite absorbing oxygen, and the silica gel absorbing water vapor. This filter device is not adapted to remove vapors.

U.S. Pat. No. 4,256,474 discloses a two-piece twist apart filter housing adapted to be interposed in a conduit supplying or receiving air from a device, in particular the filter assembly employed therein includes a particulate filter, a coalescing filter and an odor filter. The use of a vapor filter element, however, is not disclosed.

U.S. Pat. No. 4,294,599 discloses an aerosol respirator cartridge employing the combination of a pre-filter comprised of glass fibres, in combination with final filtering components formed of resin impregnated wool felt. The patent does not disclose the use of a vapor filter element.

Further, in many prior art filter devices, particularly employing a plurality of filter elements, such filter elements must be individually removed from the filter unit for cleaning and thereafter replaced. Particularly where toxic substances such as toxic gases, biological contaminants and nuclear contaminants are present in the spent filter elements, this presents a substantial danger and hazard to personnel handling such filter elements during cleaning and replacement thereof.

It is an object of the present invention to provide a filter device or unit for removing contaminants from air, and comprising a plurality of filter elements to remove various types of contaminants from the air to provide clean air.

Another object is to provide a filter unit of the above type and designed primarily for use in aircraft, especially military aircraft.

A further object is the provision of a filter unit of the above type particularly designed to remove particulate, aerosol and vapor contamination from air before it is delivered to the crew or equipment in an aircraft.

A particular object is the provision of a filter system for removal of chemical and/or biological and/or nuclear contaminants from life support air.

A still further object is to provide an efficient multiple stage filter unit of the above type which is operable under varying pressures, temperatures and humidities, for removal of contaminants from air, especially contaminants of the above type, involving either straight through, i.e. series flow, or particularly parallel flow, employing multiple filter elements, and providing high capacity flow of air through the filter unit.

SUMMARY OF THE INVENTION

The improved filter unit of the invention comprises a combination of two filter elements, a first filter element preferably being a particle/aerosol filter element capable of removing aerosol and particulate matter, e.g. fog, smoke, dust, bacteria, radioactive particles and the like, from the air, and the second filter element being in the nature of a vapor or gas filter element capable of removing toxic gases. The combination of filter elements is enclosed in an outer shell supporting containers for the filter elements, and including an inlet for contaminated air and an outlet for the clean air discharged from the filter unit.

The filter system of the invention is adapted for use in various modifications depending upon the design requirements. Thus, the use of a combination of individual filter elements to develop the filter system of the invention permits design latitudes varying from a system employing a single set of filter elements consisting of one particle-aerosol filter element and one vapor filter element, to as many as are necessary for the particular design requirements. Thus, the use of one set of such filter elements allows the shortest design for straight through flow of the contaminated air through the filter unit. In this embodiment, all the contaminated air will pass through one particle/aerosol filter element and one vapor filter element.

According to a further embodiment, several sets of such particle/aerosol and vapor filter elements is used wherein the diameter space is limited but length space is available. In this embodiment parallel flow of the contaminated air through the respective sets of filter elements is provided, each of the multiple filter elements having its own inlet and outlet. Hence a filter system of this nature can be designed for installation with one inlet air source and a common outlet of clean air, or separate outlets for clean air to several places, from the respective sets of filter elements. In this multiple stage filter unit, the filter element can be of different sizes, depending on airflow requirements, while all are supported in the same outer shell or container.

The shape and size of the outer shell or container, and of the respective filter elements can be developed to fit the design requirements.

Broadly, the invention device is a filter system for removal of particulate, aerosol and vapor contamination from air which comprises an outer shell,
a first contaminated air inlet to said shell,
a first clean air outlet from said shell,
at least one set of filter elements, comprising a particle/aerosol filter element and a vapor filter element supported in adjacent contiguous relation in said shell,
an inlet passage to said particle/aerosol filter element of each set of said filter elements, said inlet passage communicating with said first inlet for contaminated air,
a passage from said particle/aerosol filter element to said vapor filter element, and
an outlet passage from said vapor filter element of each set of said filter elements, said outlet passage communicating with said first outlet for discharge of clean air from said shell.

THE DRAWINGS

The filter unit or device of the invention will be more clearly understood by reference to the description below of certain preferred embodiments, taken in connection with the accompanying drawings, wherein:

FIG. 1 is a side elevation, partly broken away, of one embodiment of a filter device containing a particle/aerosol filter element and a vapor filter element in adjacent contiguous relation, for treatment of air to remove particulate, aerosol and vapor contaminants from air by straight through flow of the air through the filter device;

FIG. 2 is a vertical end view, partly broken away, of the device of FIG. 1;

FIG. 3 is a plan view, partly broken away, of another embodiment of the invention filter device, containing a plurality of sets of particle/aerosol filter elements and vapor filter elements, and showing the inlet and outlet of each such sets of filter elements, for passage of air in parallel flow through the device;

FIG. 4 is a vertical section taken on line 4—4 of FIG. 3;

FIG. 6 is an exploded view showing the components of a particle/aerosol filter element;

FIG. 7 is a view taken on line 7—7 of FIG. 6;

FIG. 8 is a view taken on line 8—8 of FIG. 6;

FIG. 9 is an exploded view showing the components of a vapor filter element;

DESCRIPTION OF PREFERRED EMBODIMENTS OF THE INVENTION

Figure 5:
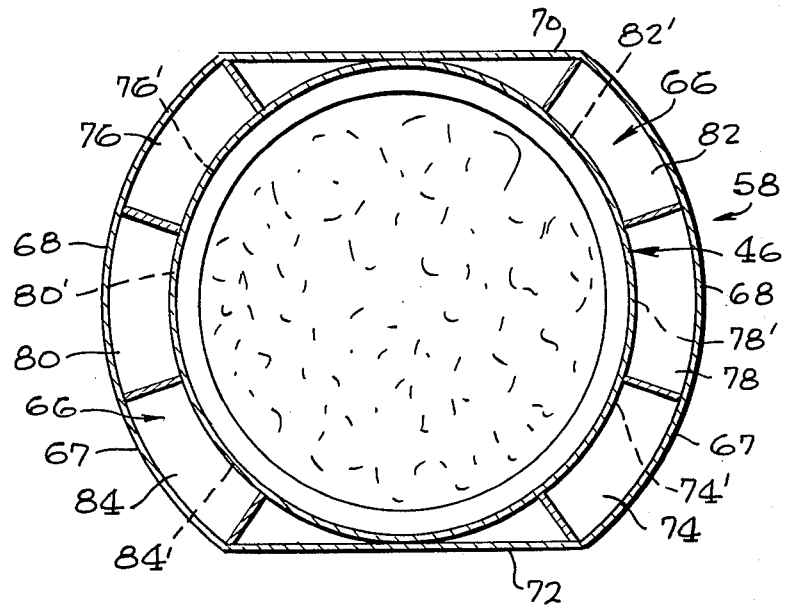
FIG. 5 is a vertical section taken on line 5—5 of FIG. 3.

Referring to FIGS. 1 and 2 of the drawing, showing an embodiment of a filter device containing a single set of one particle/aerosol filter element and one vapor filter element, numeral 10 illustrates the filter device containing a particle/aerosol filter element 12 and a vapor filter element 14 in adjacent contiguous relation, centrally positioned in an outer shell or container 16 having a substantially cylindrical body portion 17. Filter elements 12 and 14 are held in fixed axial position by stops 19 abutting the opposite ends of the filter elements. The outer casing has an inwardly flaired inlet cap 18 containing an air inlet 20, connected to one end of body portion 17, and connected to the opposite end of body portion 17 is an inwardly flaired outlet cap 22 containing an outlet 24 for discharge of clean air after passage of the contaminated air through the filter device.

The particle/aerosol filter element 12 is comprised of the components shown in FIG. 6. In constructing such filter element, the filter component 26 is inserted into the container 28 through an open end 30 thereof. The particle/aerosol filter component 26 is comprised of a material which is capable of adsorbing biological contaminants and also particulate contaminants including dust, germs and particles generally of a diameter larger than molecular, and including nuclear particles. Such filter elements will also capture aerosols and chemical particles. One type of particle/aerosol filter which can be employed is a paper filter, although other types such as fiberglass or cloth can be employed. The quantity of such filter material required will be governed by the quantity of particles and aerosols in the inlet air, the filter use time and the allowable pressure drop for a saturated filter. After insertion of the aerosol/particle filter 26 into the container 28, the retainer component 32 is slipped into the container 28 inside the open end 30 thereof and in contact with the filter element 26, with sufficient force to apply a compressive force, e.g. 5 pounds per square inch on component 26. The force applied is insufficient to crush the filter component 26 but sufficient to force the outer surface of the retainer component 32 flush with the open end of the container 28. This configuration is held while an adhesive or sealant is applied to the groove 31 (see FIG. 10) between the retainer 32 and the adjacent outer end surface of the container 28, allowed to cure. Large apertures 33 and 35 are provided in components 28 and 32, respectively, for passage of air into and out of filter element 12.

The construction of the vapor filter element 14 of FIG. 1 is shown in FIG. 9. In FIG. 9, a vapor filter material support screen 34 is first inserted into the bottom of the container 36 through the open end 38 thereof and centered at the bottom of the container. On top of the support screen 34 is placed a vapor filter material containment cloth 40 such as muslin, component 40 also being centered, with its outer periphery glued to the inner surface of the container 36 (see also FIG. 10). Vapor filter material, preferably in the form of "whetlerized" charcoal, indicated at 42, and understood to be activated charcoal which has been treated with heavy metal salts, is then added to container 36 over the containment cloth 40. The particles of charcoal are added by means of a drop tower which allows gravity feed of the charcoal and fills the container 36 at bulk density in a uniform layer across the container. The quantity of such filter material required will be governed by the concentration of the inlet toxic gases, the filter use time and the geometry of the specific filter elements. If the filter material is "whetlerized" charcoal, the quantity employed can be determined by the use of a modified Wheeler adsorption kinetics equation (reference L. A. Jones and J. A. Rehrman, Carbon, Vol. 16 pp. 47–51 (1978). The vapor filter element is designed to adsorb and capture vapors evaporated from the aerosols in the particle/aerosol filter element 12, and those vapors that pass directly through filter element 12. The vapor filter element 14 containing the charcoal 42 will adsorb the gases and vapors.

After incorporation of the charcoal filter medium 42 into the container 36, a second vapor filter material containment cloth 40' is placed on top of the charcoal filter medium 42 and centered thereon. A second vapor filter material support screen 34' is then placed on top of and centered over the second containment cloth 40', while pushing component 40' down against the charcoal. A retainer 44 is then slipped into the open end 38 of the container 36 and over the second material support screen 34', and pushing the adjacent second containment cloth 40' down around the charcoal. Sufficient force is applied to the retainer 44 and material support screen 34', to apply, e.g. 25 lbs. per square inch maximum compressive force, to cause retainer 44 to be flush with the open end of the container 36. This configuration is maintained while an adhesive or sealant is applied to the groove 45 (see FIG. 10) between the retainer 44 and the adjacent outer end surface of the container 36, and allowed to cure. Large apertures 47 and 49 are provided in components 36 and 44, respectively, for passage of air into and out of filter element 14.

Figure 10:
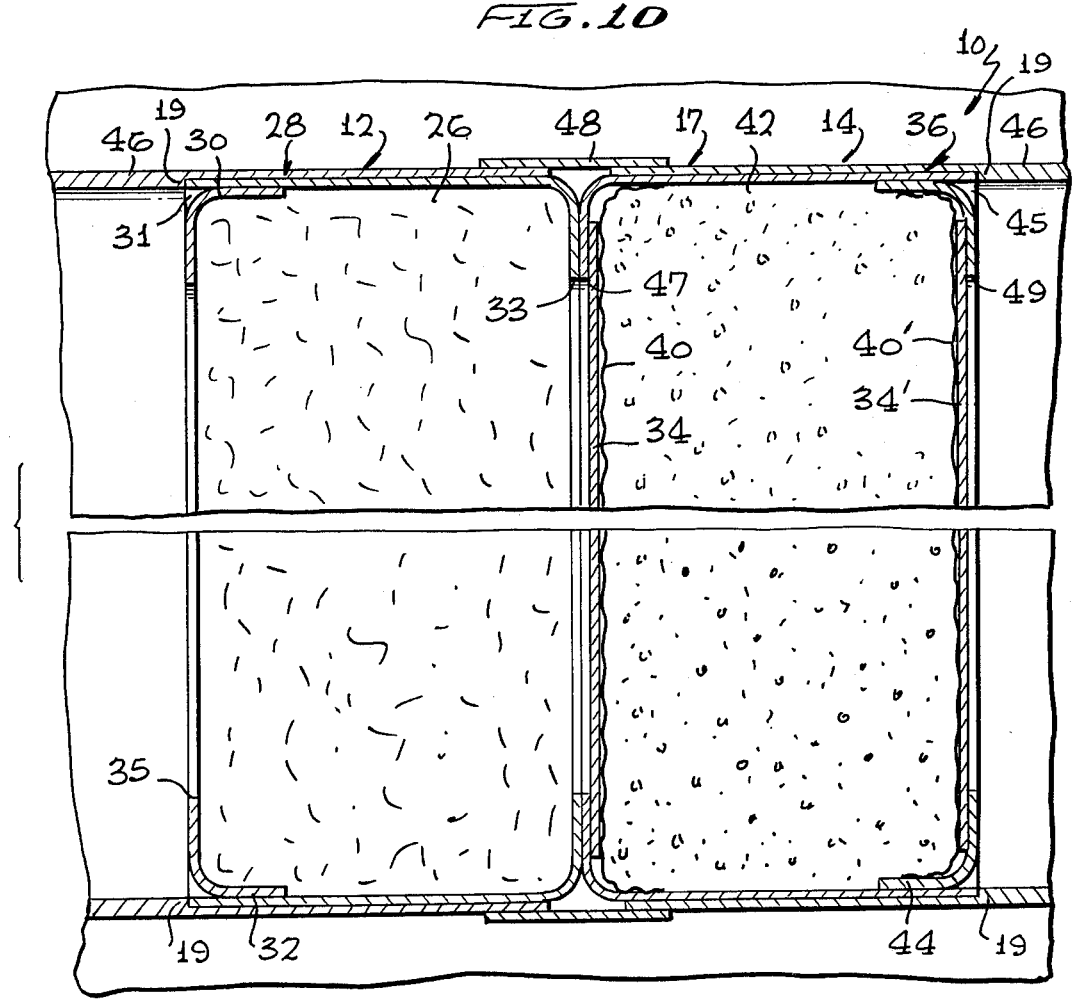
FIG. 10 is a detail taken on line 10—10 of FIG. 4, showing the combination of an assembled particle/aerosol filter element and a vapor filter element in adjacent or contiguous relation, employed in the devices of FIGS. 1 and 4.

Referring to FIG. 10, containers 28 and 36 containing the particle/aerosol filter material 26 and the vapor filter material 42, respectively, are placed in adjacent contact with each other and are each supported in a sleeve 46 positioned around the cylindrical containers 28 and 36 within the central body portion 17 of filter device 10, are held in fixed axial position by the stops 19 abutting the opposite ends of the containers. A connector ring 48 is positioned around the adjacent ends of the sleeves or base members 46 supporting the containers 28 and 36, and is connected to such sleeves, as by the use of an adhesive. It is seen that in the relation of filter elements 12 and 14, as shown in FIGS. 1 and 10, contaminated air passes first into and through the particle/aerosol filter component 26 and then into and through vapor filter component 42, and is discharged as clean air into outlet cap 22.

The filter device modification of FIG. 1 employing a single set, that is one each, of the filter elements 12 and 14 is utilized in an installation, e.g. in an aircraft, where length space is limited and diameter space is available. In this modification, all of the contaminated air containing aerosol, solid particles and gases or vapors, particularly chemical, biological and nuclear contaminants, will pass straight through one particle/aerosol filter element 12 and one vapor filter element 14 to provide clean air.

The filter device of the invention, comprised of a combination of filters, as illustrated e.g. in FIGS. 1, 2, 6, 9 and 10, is particularly designed for protection of personnel against chemical, biological and nuclear warfare contaminants, and is useful in an aircraft.

Referring to FIGS. 3, 4 and 5 of the drawing, numeral 50 is another modification of the filter device of the invention, formed of a combination of three sets of filters 52, 54 and 56, spaced apart from each other, each set comprised of a combination of a particle/aerosol filter element 12 and a vapor filter element 14 of the same construction as described above and shown in FIGS. 6-10, the filter elements 12 and 14 of each set of filter elements being connected in adjacent contiguous contact by a connector ring 48 as described above. The filter device 50 has an outer shell 57 having a central partially cylindrical body portion 58, an inwardly flaired inlet cap 59 containing an air inlet 60, and an inwardly flaired outlet cap 62 containing a clean air outlet 64.

The three sets of filter elements 52, 54 and 56 are positioned and supported in axial alignment in the supporting sleeve 46 mounted on end plates 61 and 63 within the outer casing 57. The diameter of the containers 26 and 36 of the filter elements 12 and 14 of the 3 sets of filters 52, 54 and 56, is equal, and is smaller than the diameter of the inner surface of the partially cylindrical body portion 58 of the filter device, leaving an annular space 66 between the outer periphery of each of the respective filter elements and the inner surface of the outer cylindrical wall portions 67 of body portion 58. However, as shown in FIG. 5, such annulus extends only around the two outer cylindrical sides 68 of the body portion 58, the upper and lower surfaces 70 and 72 of member 58 being flat.

It is seen in FIG. 5 that there is provided an inlet 74 into the particle/aerosol filter element 12 of the first set of filters 52, and a clean air outlet 76 from the vapor filter element 14 of the first set of filters 52. Similarly there is provided a separate contaminated air inlet 78 to the particle/aerosol filter element 12 of the second set of filters 54, and a clean air outlet 80 from the vapor filter element 14 of the second set of filters 54, and a contaminated air inlet 82 into the particle/aerosol filter element 12 of the third set of filters 56, and a clean air outlet 84 from the vapor filter element 14 of the third set of filters 56. Thus, each of the contaminated air inlets 74, 78 and 82 into the three sets of filters 52, 54 and 56 communicates with inlet cap 59, and each of the clean air outlets 76, 80 and 84 from the three sets of filters 52, 54 and 56, discharges into the outlet cap 62 and outlet 64.

Figure 12:
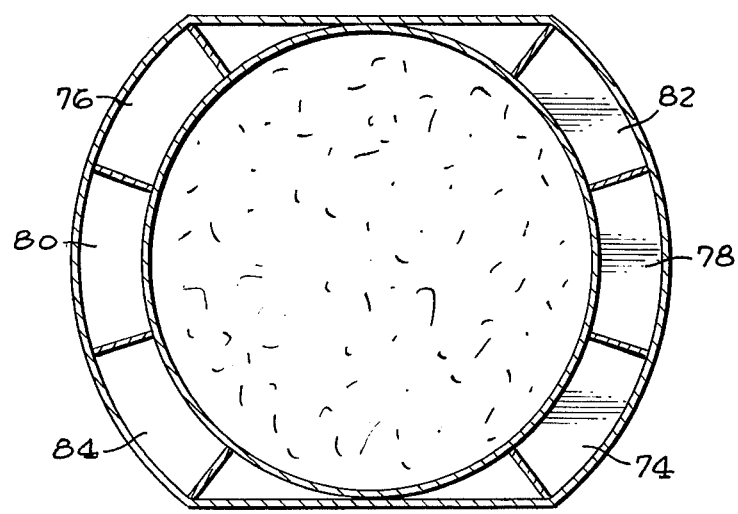
FIG. 12 is a vertical section taken on line 12—12 of FIG. 4.
Figure 11:
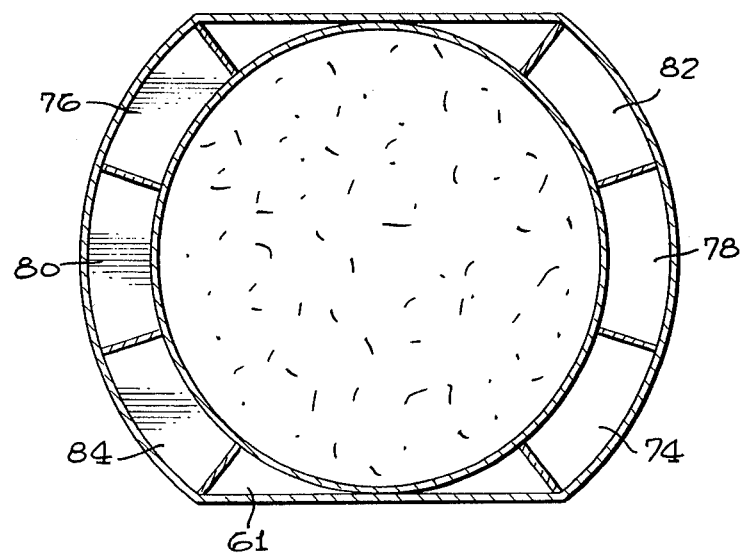
FIG. 11 is a vertical section taken on line 11—11 of FIG. 4.

It will be seen that the inlets 74, 78 and 82 to the three sets of filters 52, 54 and 56 are diagonally opposite the respective outlets 76, 80 and 84, for greater efficiency. Each of the inlets 74, 78 and 82 is in the form of an elongated duct or conduit of arcuate cross section which extends axially from the inlet cap 59 to the outlet cap 62, the inner ends of such ducts being open to the inlet cap 59 but closed off at the opposite end from outlet cap 62, as seen in FIGS. 11 and 12. Each of the air outlets 76, 80 and 84 is also in the form of an elongated duct or conduit of arcuate cross section, which also extends axially from inlet cap 59 to outlet cap 62, but which are closed off from inlet cap 59 and open to the outlet cap 62, as also seen in FIGS. 11 and 12.

Each of the inlet ducts 74, 78 and 82, communicates with an arcuate inlet port 74', 78' and 82', respectively, in the supporting sleeve 46, and each of the outlet ducts 76, 80 and 84 communicates with an arcuate outlet port 76', 80' and 84', respectively, in the supporting sleeve 46. The inlet port 74' communicates with the space 86 separating the first set of filters 52 and the end plate 61. The outlet port 76' from the first set of filters 52 and the inlet port 78' to the second set of filters 54 are located in the space 88 between the first and second sets of filters 52 and 54, and are separated by the baffle 90. The outlet port 80' from the second set of filters 54 and the inlet port 82' to the third set of filters 56, are located in the space 92 between the second and third sets of filters 54 and 56, and are separated by the baffle 94. The outlet port 84' from the third set of filters 56 is located in space 96 between the third set of filters 56 and the end plate 63.

Thus, contaminated air flows (1) through inlet 74, inlet port 74', through the first set of filters 52, through outlet port 76', into outlet 76;

(2) through inlet 73, inlet port 78', the second set of filters 54, outlet port 80' and outlet 80; and (3) through inlet 82, inlet port 82', the third set of filters 56, through outlet port 84' and outlet 84.

All of the outlets communicate with inlet cap 59 and all of the outlet communicate with the outlet cap 62.

Thus, it is noted that the modification of FIGS. 3–5 is a parallel flow device wherein each of the multiple filters 52, 54 and 56 has its own inlet and outlet. Such filter device is useful where the diameter space within the installation, e.g. in an aircraft, is limited, but length space is available. Since each of the multiple filter elements 52, 54 and 56 has its own inlet and outlet, a filter system of this type can be employed for installation with one inlet air source and separate outlets to several locations. Under these conditions, the filter elements of the sets 52, 54 and 56 can be of the same or different sizes, depending on air flow requirements, while all being disposed in the same container or shell.

It will be understood that if desired, more than three sets of filters or filter elements can be employed in the device of FIGS. 3 to 5. Where more than three such sets of filter elements, say five, are utilized, thus requiring additional sets of inlets and outlets, viewing FIG. 5, these additional inlets and outlets of arcuate cross section placed in the annulus 66, would require that the outer shell 58 be completely cylindrical, with no flat portions such as 70 and 72.

Several particle/aerosol filter elements and vapor filter elements can be used in parallel as in FIGS. 3 to 5, to develop the same filtering capability as a short length, large diameter, straight through flow filter system, of the type illustrated in FIGS. 1 and 2. For the same filter volume of filter material, as the diameter decreases the number of the filter elements increases according to the following equation.

$$V = tAN \quad (1)$$

where
V = volume
t = thickness
A = filter element flow area
N = number of filter elements Also, $A = \pi D^2/4$, where D = diameter of filter flow area. Substituting the above in equation (1) and solving for the diameter gives:

$$D = \sqrt{4V/\pi tN}$$

The system contains a sufficient quantity of the particle/aerosol and vapor filter material to cleanse the required contaminated airflow for a prescribed length of time. A representative filter system of the type described herein will decontaminate inlet gas that is within the following parameters:

| | |
|---|---|
| Temperature | 350° F. maximum |
| Gas Flow Rates | 5–50 lbs. per minute |
| Filter System Pressure Drop | 0.5–5 lbs./in.$^2$ |
| Inlet Pressure | 0.5 to 5 atmospheres |
| Relative Humidity | 0 to 85% |

The outer shell 16 or 50, and filter element containers 28 and 36 can be made of many materials including metals. However, preferably these components are made of spun fiber glass reinforced epoxy, glass fabric reinforced epoxy, or epoxy impregnated aramid fabric understood to be an amide-imide polymer. These materials can supply the strength, temperature, chemical and humidity tolerance and light weight required, and can be safely disposed of after contamination. These outer shell and filter element materials of construction are more adaptable to involved shapes generally required in aircraft installations than a metal container. Where the contaminated gas is at temperatures well above 350° F. and pressures above 5 atmospheres, the filter material would be other than as previously described, and the outer shell and filter element containers would be made of materials commensurate with the gas temperature and pressure, such as corrosive resistant steel. The filter assemblies described above can be manufactured in fixtures that will maintain dimensions, and held in a final assembly fixture until its adhesive cure is complete so as to assure overall dimensional requirements for installation. After adhesive cure is complete the filter assembly can be tested for pressure drop, leakage, etc., dried, packaged to maintain integrity and stored or shipped as required.

The various parts of this filter assembly can be sized to accept different air mass flow rates, and different sizes of filter elements to adjust to different time spans before filter saturation. It can be made to incorporate as many filter elements as are necessary to meet filtration requirements. The inlet and outlet configurations can be made to fit any installation.

A main advantage of the invention filter system is that it is made as one unit with no internal leak paths to allow unfiltered air into the crew and/or equipment areas. When the filter needs changing, the entire assembly is removed and replaced. The possibility of system contamination during removal and replacement is greatly reduced. After removal the contaminated filter assembly is burned without additional handling.

The installation of the filter assembly preferably should include combination isolation and bypass valves at the inlet and outlet of the filter assembly so that air may bypass the filter for operation conditions in which the filter is not needed. The isolation valves are necessary to seal off the filter elements and protect them from contamination by everyday vapors, dust, and moisture which otherwise could contaminate the filter and make it worthless when required for use, e.g. in an actual contaminant attack.

From the foregoing, it is seen that the invention provides an improved versatile filter device especially adapted for use in removal of chemical, biological and nuclear contaminants from air in aircraft, particularly military aircraft. This is accomplished by employment of a combination of suitable filter elements, as described above, and which can be readily designed for the particular conditions encountered. The system is lightweight, durable and can be discarded when the filter elements are spent without danger to personnel. Although the filter system of the invention is designed for use in aircraft, particularly military aircraft, it can be employed in any application requiring clean air such as on tanks, trucks, and the like, and can be adapted to any reasonable volume and airflow requirements.

While we have described particular embodiments of the invention for purposes of illustration, it will be understood that the invention is not to be taken as limited except by the scope of the appended claims.

We claim:

1. A filter system for removal of particulate, aerosol and vapor contaminants from air, which comprises:

an outer shell having an inlet cap connected to one end of said outer shell, said inlet cap including a first contaminated air inlet, and an outlet cap connected to said outer shell at the other end thereof, said outlet cap including a first clean air outlet;

a plurality of filter units mounted axially in said shell, each comprising two containers, one of said containers having a particle/aerosol filter element therein and the other of said containers having a vapor filter element therein, said two containers of each filter unit being positioned in contiguous relation;

a passage from one container to said other container of each said filter unit;

said containers having a diameter smaller than the inside diameter of said shell and positioned therein to define an annulus between the outer periphery of said containers and the inner surface of said shell;

a plurality of elongated inlet conduits in said annulus, each of said respective conduits defining an inlet passage to said one container of each of said filter units; and a plurality of elongated outlet conduits in said annulus, each of said outlet conduits defining an outlet passage from said other container of each of said filter units;

said inlet conduits communicating with said inlet cap and said outlet conduits communicating with said outlet cap.

2. A filter system as defined in claim 1, said particle/aerosol filter element comprising a paper filter medium and said vapor filter element comprising a charcoal filter medium.

3. A filter system as defined in claim 1, said particle/aerosol filter element comprising a fiberglass filter medium and said vapor filter element comprising a charcoal filter medium.

4. A filter system as defined in claim 1, said outer shell and said containers comprised of fiberglass reinforced epoxy.

5. A filter system as defined in claim 1, said outer shell and said containers comprised of epoxy impregnated aramid fabric.

6. A filter system as defined in claim 1, including a sleeve mounted in said shell, said containers for said filter units being substantially cylindrical and supported in axial alignment in said sleeve so that said annulus is defined by the outer periphery of said sleeve and the inner surface of said shell, an inlet port in said sleeve in flow communication with said inlet conduits to said one container of each of the respective filter units, and an outlet port in said sleeve in flow communication with said outlet conduits to said other container of each of the respective filter units.

7. A filter system for removal of particulate, aerosol and vapor contaminants from air, which comprises:

an outer shell having a substantially cylindrical central body portion, an inwardly flaired inlet cap connected to one end of said central body portion, said inlet cap including a first contaminated air inlet, and an inwardly flaired outlet cap connected to said central body portion at the other end thereof, said outlet cap including a first clean air outlet;

a plurality of filter units mounted axially in the central body portion of said shell;

said filter units each comprising two substanially cylindrical containers, one of said containers having a particle/aerosol filter element therein and the other of said containers having a vapor filter element therein, said two containers of each filter unit being positioned in contiguous relation, the containers of each of said filter units having a diameter smaller than the inside diameter of said shell, and forming an annulus between the outer periphery of said containers and the inner surface of said shell;

a plurality of elongated inlet conduits of arcuate cross-section in said annulus, extending axially of said filter system, each of said respective conduits forming an inlet passage to said one container of each of said filter units;

a passage from said one container to said other container of each of said filter units;

a plurality of elongated outlet conduits of arcuate cross-section in said annulus extending axially of said filter device, each of said outlet conduits forming an outlet passage from said other container of each of said filter untis;

said inlet conduits communicating with said inlet cap, and said outlet conduits communicating with said outlet cap, thereby permitting parallel flow of contaminated air passing through said first air inlet, through the respective sets of filter elements and discharged from said first clean air outlet.

8. A filter device as defined in claim 7, including a sleeve, said filter containers mounted in said sleeve, the adjacent filter units being spaced from each other, with inlet and outlet ports provided in the sleeve between adjacent filter units, and baffle means separating inlet and outlet ports in the spaces between adjacent filter units, said inlet and outlet ports communicating with said inlet and outlet conduits, respectively, said filter units being positioned with said one container having the particle/aerosol filter element, facing said inlet cap, and said other container having the vapor filter element, facing said outlet cap.

9. The filter system as defined in claim 7, said outer shell and said containers comprised of fiberglass reinforced epoxy, said particle/aerosol filter element comprising a paper filter medium and said vapor filter element comprising a charcoal filter medium.

10. The system as defined in claim 7, said outer shell and said containers comprised of fiberglass reinforced epoxy, said particle/aerosol filter element comprising a fiberglass filter medium and said vapor filter element comprising a charcoal filter medium.

* * * * *